(No Model.)
W. W. EDWARDS.
PIPE COUPLING.
No. 604,857. Patented May 31, 1898.
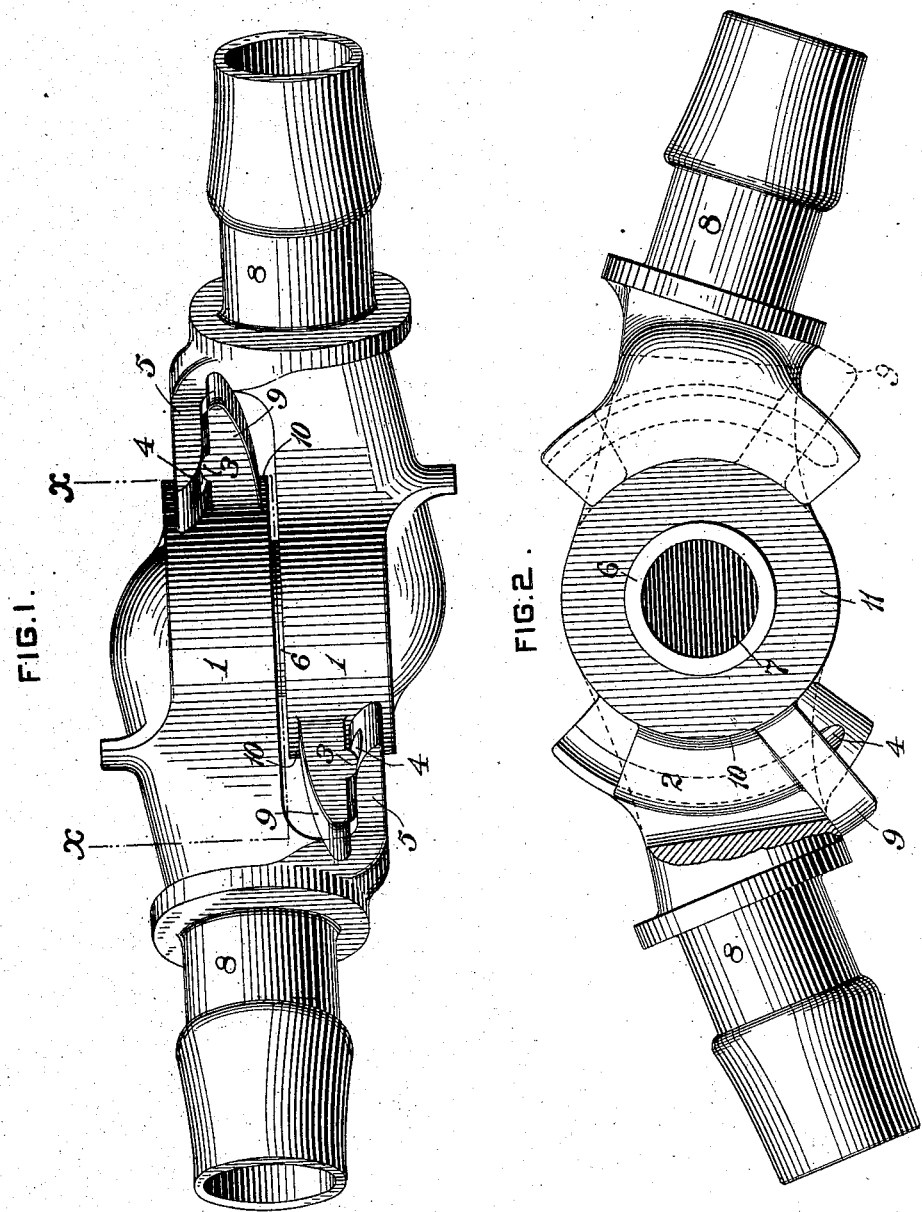
WITNESSES:
Chas. F. Miller.
E. Gallagher
INVENTOR,
William W. Edwards,
by T. J. Hogan, Att'y.

UNITED STATES PATENT OFFICE.

WILLIAM W. EDWARDS, OF WILMERDING, PENNSYLVANIA, ASSIGNOR TO HENRY HERMAN WESTINGHOUSE, OF PITTSBURG, PENNSYLVANIA.

PIPE-COUPLING.

SPECIFICATION forming part of Letters Patent No. 604,857, dated May 31, 1898.

Application filed August 26, 1897. Serial No. 649,570. (No model.)

*To all whom it may concern:*

Be it known that I, WILLIAM W. EDWARDS, a citizen of the United States, residing at Wilmerding, in the county of Allegheny and State of Pennsylvania, have invented or discovered a certain new and useful Improvement in Pipe-Couplings, of which improvement the following is a specification.

The object of my invention is to provide an improvement in pipe-couplings; and to this end my invention consists in new and improved means for limiting the relative movement of the two half-sections of a coupling device which is provided with lateral openings and adapted to be coupled by a partial rotary movement of the half-sections.

In the accompanying drawings, Figure 1 is a plan view of a pipe-coupling, showing two half-sections coupled together and provided with my improvement; and Fig. 2 is a view at right angles to that shown in Fig. 1, a portion of one of the half-sections, which is included between the extremities of the line *x x* in Fig. 1, being broken away in Fig. 2 and shown only by dotted lines.

My improvement is specially adapted to be applied to pipe-couplings of the class shown in Patents No. 157,951, granted to Westinghouse December 22, 1874, and No. 458,542, granted to Welsh August 25, 1891, known as "Westinghouse" pipe-couplings, in which the half-sections are provided with lateral openings adapted to register with one another and in which the half-sections are locked together by a partial rotary movement.

In couplings of the kind referred to it is essential that the relative rotary movement of the parts necessary to couple them together should be limited for convenience in coupling and in order to secure the automatic detachability of the coupling when employed for connecting the pipes or sections of hose under cars, and also to prevent wear which might be caused by any undue relative movement of the parts.

The essential feature of my invention is the new and improved means employed for limiting the relative rotary movement of the half-sections in the act of coupling.

As shown in the drawings, each of the half-sections 1 is provided with a projection, hook, or flange 2, having a bead or rounded portion 3 formed thereon, and each of these projections 2 is adapted to engage with or fit into a groove 4 on a hook 5, formed integral with the other half-section. The two half-sections being alike in all respects, each of them is provided with a projection, hook, or flange 2 and with a hook 5 or equivalents of these parts.

In coupling the half-sections 1 the gaskets 6, which are fitted in the lateral openings 7, are placed together before the parts 2 and 5 are engaged, and the half-sections are then rotated relatively to one onother, so as to engage the bead or rounded edge of the part 2 of each half-section with the groove or depression 4 of the hook 5 on the other half-section, and this rotary movement of the half-sections relative to one another is limited in some constructions by means of a stop consisting of a pin or post, against which the edge of the part 2 strikes when the two half-sections have been turned to such a degree as to bring the parts 8 into the desired angular position relatively to one another.

The pin which has been employed heretofore to form a stop to limit the relative rotary movement of the half-sections passes through and has one end fixed on one edge of the hook 5, the other end of the pin being fixed in a hole in the main shell of the coupling or in a projection formed for the purpose of receiving the pin. The stop-pin cannot be inserted in its place until the parts of the half-sections have been finished, as it would interfere with the movement of the tool—for example, in finishing the groove or depression with which the bead 3 engages. By means of my improvement the employment of the stop-pin is dispensed with and the additional expense of drilling the holes for the pin and securing it in place is avoided.

In accordance with my improvement a lug or projecting portion 9 is formed on each half-section 1 in position to engage with the shell of the other half-section or with the edge of the hook 5 of the other half-section when the two half-sections have been turned into the coupled position. The projection 9 may be merely an extension of the part 2, or it may be a projection extending from the curved outer end portion 10 of the half-section. In the drawings the lug or projection 9 extends outward from the curved part 10 of the shell far enough to engage with the other half-section near the point at which the edge of the hook 5 merges into the shell 1. The base of the lug 9 is somewhat thicker than the part 2 in order to give sufficient strength; but it is preferred that the lug or projection 9 should be offset from the face 11 of the shell, so as not to interfere with the machining of that face, and it is so formed that it will not interfere with the formation or function of the bead or rounded portion 3, which engages in the groove or depression 4.

The lug or projection 9 is preferably cast integral with the shell 1 and with the part 2, and the separate operation of drilling and securing the pin in place, which is necessary when a pin is employed as a stop, will be rendered unnecessary.

My improvements add nothing to the cost of the coupling, while it dispenses not only with the pin commonly used, and thereby dispenses with the drilling and other labor necessary to secure the pin in place, but also dispenses with the ugly projections in which the ends of the pins are usually secured.

A further important feature of my invention consists in the provision of a stop 9 for the purpose described which does not in any way interfere with the machining of the coupling-shell or the employment of a tool for machining the face 11 or the groove 4 or the inside surface of the hook 5.

I claim as my invention and desire to secure by Letters Patent—

1. In a half-section of a pipe-coupling provided with a lateral opening and adapted to be coupled with a similar half-section by a partial rotary movement, a flange or hook on the end of the coupling, and a stop formed on the half-section between the back of the half-section and the plane of the face of the half-section and offset from the plane of the face, substantially as set forth.

2. In a half-section of a pipe-coupling, provided with a lateral opening and adapted to be coupled with a similar half-section by a partial rotary movement, a flange, or hook, on the end of the coupling and a projection, or extension, formed integral with the flange, or hook, and adapted to form a stop to limit the rotary movement of the half-section when coupled with a similar half-section, substantially as set forth.

3. In a pipe-coupling, comprising two half-sections having lateral openings and adapted to be rotated in a longitudinal plane to effect the coupling of the half-sections, a lug or projection formed on the curved end portion of a half-section and adapted to engage with the casting or shell of the other half-section to limit the relative rotary movement of the half-sections, substantially as set forth.

In testimony whereof I have hereunto set my hand.

WILLIAM W. EDWARDS.

Witnesses:
CHAS. A. WOODS,
JOHN SCHULTZ.